United States Patent [19]

Park et al.

[11] Patent Number: 4,776,677
[45] Date of Patent: Oct. 11, 1988

[54] MEANS AND METHOD FOR REDUCING THE AMOUNT OF LIGHT IRRADIATING AN OBJECT

[75] Inventors: Yong K. Park, Vadnais Heights; Anil K. Jain, New Brighton, both of Minn.

[73] Assignee: Honeywell Inc., Minneapolis, Minn.

[21] Appl. No.: 537,137

[22] Filed: Sep. 29, 1983

[51] Int. Cl.$^4$ .............................................. G02F 1/015
[52] U.S. Cl. .................................................. 350/354
[58] Field of Search ................... 350/354–355, 350/363, 393, 276 R, 356, 380, 390; 356/352

[56] References Cited

U.S. PATENT DOCUMENTS

| | | | |
|---|---|---|---|
| 2,213,307 | 9/1940 | Elliott | 350/356 |
| 3,062,103 | 11/1962 | Bolz . | |
| 3,395,961 | 8/1968 | Ready | 350/355 |
| 3,495,893 | 2/1970 | Geusic et al. . | |
| 3,519,329 | 7/1970 | Buhrer et al. | 350/356 |
| 3,578,848 | 5/1971 | Austin . | |
| 3,623,795 | 11/1971 | Taylor et al. | 350/393 |
| 3,625,594 | 12/1971 | Lanza | 350/355 |
| 3,655,266 | 4/1972 | Buchan | 350/355 |
| 3,790,252 | 2/1974 | Pao | 350/354 |
| 3,792,916 | 2/1974 | Sarna . | |
| 4,035,527 | 7/1977 | Deeg . | |
| 4,410,239 | 10/1983 | Kaplan et al. | 350/393 |
| 4,464,021 | 8/1984 | Brown et al. | 350/354 |

OTHER PUBLICATIONS

Felber et al, "Theory of Nonresonant Multistable Optical Devices", App. Phys. Letts., 6-15-76, pp. 731-733.

Harris, T. J. "Light Beam Deflection", IBM Tech. Disc. Bull, 7-1963, pp. 101-102.

Smith et al, "Bistable Optical Devices Promise Subpisecond Switching", IEEE Spectrum, 6-1981, pp. 26-31.

Liu et al, "Optical Beam Deflection by Pulsed Temperature Gradients in Bulk GaAs", Proc. IEEE, 5-1965, pp. 522-523.

Gibbs et al, "Room-Temperature Excitonic Optical Bistability in a GaAs-GaAlAs Superlattice Etalon", App. Phys. Letts., 8-1-82, pp. 221-222.

Primary Examiner—William H. Punter
Attorney, Agent, or Firm—William T. Udseth; John G. Shudy, Jr.

[57] ABSTRACT

A nonlinear optical medium wherein the optical index of refraction is a function of the intensity of light irradiating the medium, is employed in various devices to affect at least a portion of an incoming light beam by refracting or reflecting that portion of the light and thereby reduce the amount of light falling on an object. The nonlinear optical medium is employed in a resonator optical bistable device, in a self-bending approach and in a self-defocusing approach to provide the protective function. The spatial profile of light intensity of the incoming light can be shaped prior to the incoming light irradiating the nonlinear medium or the nonlinear medium itself can be shaped to provide the path altering function. A laser hardened device with ultra fast switching time, a large dynamic range and passive operation is a preferred application of the present invention.

4 Claims, 1 Drawing Sheet

MEANS AND METHOD FOR REDUCING THE AMOUNT OF LIGHT IRRADIATING AN OBJECT

BACKGROUND OF THE INVENTION

1. Field of the Invention

This invention relates to devices employing a nonlinear optical medium to affect, either by reflection or refraction, at least a portion of an incoming beam to reduce the illumination of an object. This invention particularly relates to such devices which are resonator optical bistable devices and to laser hardening applications of the invention.

2. Prior Art

Various devices have been proposed to reduce the amount or limit the frequencies of light irradiating an object. U.S. Pat. No. 3,792,916 to D. S. Sarna discloses a filter assembly for selectively removing preselected individual emission lines of laser energy from the visible spectrum wherein the filter comprises at least one pair of Fabry-Perot type filters which transmit laser energy emissions for dissipation in the filter assembly and reflect harmless radiation for transmission through the assembly.

U.S. Pat. No. 3,495,893 to J. E. Geusic, et al discloses a passive optical limiter utilizing the nonlinear transmission characteristics of a multiphoton absorbing material.

E. W. Deeg in U.S. Pat. No. 4,035,527 discloses optical elements comprising materials possessing phototropic or photochromic properties which are particularly adapted for use with sunglasses. Relatively long exposure times are required for the optical effects of Deeg's devices to occur.

H. M. Bolz in U.S. Pat. No. 3,062,103 provides a filter arrangement for passing a narrow range of wavelengths from a radiation beam containing a relatively broad range of wavelengths. The beam impinges obliquely on the surface of the filter medium having a strong absorption band so that total internal reflection takes place only within the range of anomalous dispersion. Within the range of anomalous dispersion, the absorbing filter medium has a lower index of refraction than the adjacent medium so that total reflection takes place at the interface if a suitable angle of incidence is chosen. The rest of the radiation passes in a refracted condition through the interface.

R. R. Austin U.S. Pat. No. 3,578,848 discloses a Fabry-Perot type interference filter in which the two reflectors are identical high reflection coatings that are separated by a spacer element made of solid glass.

It is highly desirable to provide means and methods of protecting an object from high intensity light when changes in the light intensity can occur very quickly. The prior art does not disclose means or method employing an intensity dependent, ultra fast optical switching effect to protect an object from an incoming light beam of high intensity.

SUMMARY OF THE INVENTION

The present invention discloses a device for reducing the amount of incoming light irradiating an object, comprising: a nonlinear optical medium having an index of refraction which is the function of the intensity of light irradiating the medium, the medium being positioned so that incoming light will irradiate the medium before the incoming light can irradiate the object, and wherein the medium is adapted to affect, either by reflection or refraction, at least a portion of the incoming light sufficiently so that the portion of the incoming light with the affected portion does not irradiate the object.

Several embodiments of the present are disclosed. The first employs a Fabry-Perot resonator device. The second discloses a device for refracting the incoming light rays away from the object. The third embodiment discloses a device for defocusing the incoming light so that only a weak light signal reaches the object.

Methods corresponding to the function of the above devices are also disclosed.

DESCRIPTION OF THE PREFERRED EMBODIMENT

Figure 1:
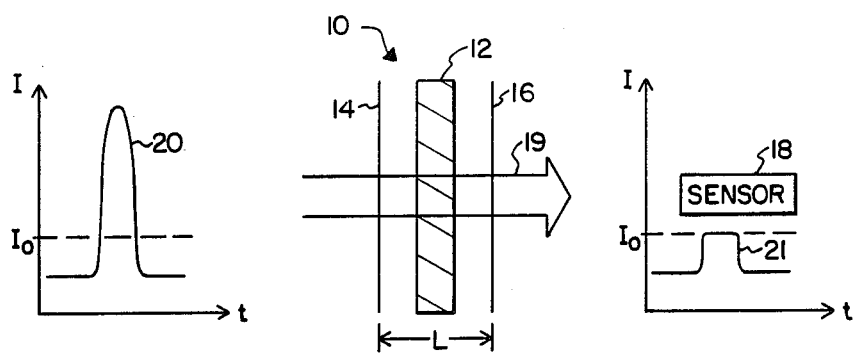
FIG. 1 is a first embodiment of the present invention.

Referring to FIG. 1, device 10 is an optical bistable resonator device, in particular a Fabry-Perot etalon, including a transparent nonlinear optical medium 12. Nonlinear medium 12 has an optical index of refraction n which is a function of the intensity of light I irradiating medium 12 (as used herein, "light" may include the entire electromagnetic spectrum). The precise relationship between n and I is complicated but generally n increases or decreases depending upon the sign of the nonlinear refraction as I increases. The operation of a Fabry-Perot resonator as an optical bistable device employing a nonlinear medium such as medium 12 is described by P. W. Smith and W. J. Tomlinson, in "Bistable Optical Devices Promise Subpicosecond Switching" *Advanced Technology Solid State*, IEEE Spectrum, June 1981, pages 26–33, the same being incorporated herein by reference.

Device 10 further includes first and second partially reflecting and partially transmitting planar surfaces 14 and 16, which are spaced in parallel relationship. The distance between surfaces 14 and 16 being L.

An object 18, such as an optical sensor, is positioned on one side of device 10. Device 10 is further positioned so that incident light first strikes surface 14. Incoming light propogating along direction 19, such as laser pulse 20, can be directed towards sensor 18 but first must pass through device 10. As is known, in a Fabry-Perot etalon, substantial transmission will occur only if the optical pathlength between surfaces 14 and 16 (i.e., the resonating cavity length) is equal to an integral number of half wavelengths ($\lambda$) of the incoming light. Optical pathlength equals physical length times the index of refraction. Therefore substantial transmission occurs only when the following equation is satisfied:

$$m \cdot \lambda/2 = n L \quad (1)$$

where m is a positive integer.

When a medium such as medium 12 is employed where the index of refraction n is a function of intensity, for the proper choice of L, device 10 can be adapted to transmit only that portion of pulse 20 having an intensity I less than a selected threshold intensity $I_o$. The portion of pulse 20 having an intensity I larger than $I_o$ will be rejected by the device 10 because that portion does not satisfy equation (1) due to the change of n which is a function of I.

In other words, the transmission band of the nonlinear Fabry-Perot filter (i.e., device 10) is shifted away from the original position in the spectral domain when the intensity is increased to above $I_o$. This is a pure optical phenomenon (i.e., no involvement of the electronic signal) and thus can be an extremely fast self-triggering optical shutter.

The particular dimensions of device 10 are heavily application dependent, however for visible to infrared light L can be on the order of $10^{-4}$ to $10^{-2}$ cm.

Particularly suitable nonlinear optical media for medium 12 include dyes, gallium arsenide and GaAs superlattices for the visible and near infrared wavelength regions, Ge, HgCdTe, $SF_6$, HgCdTe superlattices for the 2 to 20 $\mu$m wavelength region and InSb for the 5-6 $\mu$m wavelength region. Superlattices where the third order susceptibility (i.e., $\chi^{(3)}$) is large can be particularly advantageously employed in the present invention. A method of identifying such superlattices is disclosed in copending U.S. patent application of Husain et al, Ser. No. 06/432,167 entitled "Selection and Application of Highly Nonlinear Optical Media", having a common assignee with the present application and being incorporated herein by reference. Superlattices are semiconductor materials as defined by Esaki, et al in U.S. Pat. No. 3,626,257, i.e., semiconductor structures formed by a plurality of heterojunctions between alternating layers of two different semiconductor materials where the layers are thinner than the carrier mean free path of electrons in the material.

Figure 2:
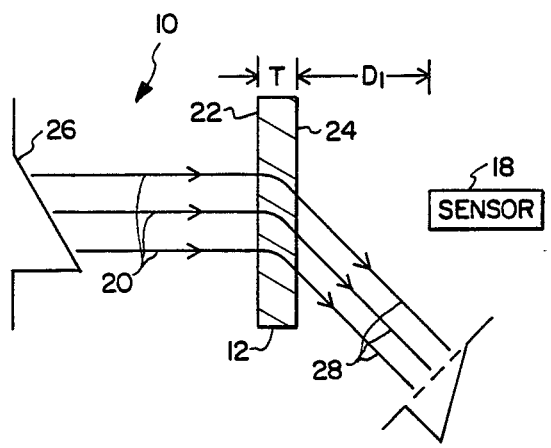
FIG. 2 is a second embodiment of the present invention.
Figure 3:
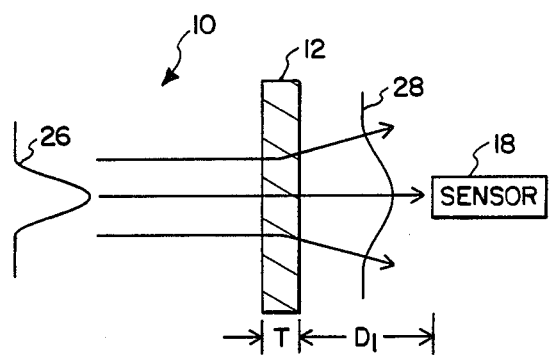
FIG. 3 is a third embodiment of the present invention.

Four other embodiments of the present invention are shown in FIGS. 2-5. For clarity, similar structure is like numbered between the remaining figures and FIG. 1. The second embodiment of the present invention in FIG. 2 employs nonlinear optical medium 12 to protect sensor 18 by a "self-bending" approach wherein the incoming light 20 is refracted by medium 12 and directed, either in part or entirely, away from object 18 so as to reduce the amount of light falling on object 18. In FIG. 2 nonlinear medium 12 conveniently employs first and second optically flat surfaces 22 and 24 disposed in spaced parallel relationship with surface 22 being placed substantially normal to the path of incoming light 20.

By first providing an asymmetrical spatial profile of light intensity of beam 20 (i.e., see profile 26) beam 20 will itself produce a corresponding asymmetrical spatial profile of the refraction index of nonlinear medium 12. As light wave 20 impinges on surface 22 it will interact with the asymmetrical spatial profile to refract the path of beam 20. A convenient asymmetrical spatial profile shown as profile 26 in FIG. 2 is a triangular profile. The resultant refracted wave front 28 of beam 20 will be refracted below the direction of beam 20 as shown in FIG. 2. For suitable distance $D_1$ between surface 24 and sensor 18, the entire wave front 28 can be directed away from object 18. Distance $D_1$, will of course depend on the refracted angle which will depend on the degree of asymmetry of spatial profile 26 and the intensity of beam 20.

In the third embodiment medium 12 is again used in conjunction with a means for shaping the spatial profile of the light intensity of beam 20 to reduce the light reaching sensor 18. However, unlike the second embodiment, the third embodiment allows some of the incoming light 20 to be transmitted unrefracted to sensor 18. Instead of refracting the direction of wave front 28, only portions of wave front 28 are refracted. This approach is referred to as the "self-defocusing" approach. A convenient spatial profile 26 of light intensity for this approach is a Gaussian spatial profile. Again depending on the particular application, distance $D_1$ between surface 24 and sensor 18 will be adjusted to determine the amount of light reaching sensor 18.

In both the second and third embodiments, the thickness T of medium 12 can be adjusted to further refract or further defocus incoming light beam 20 with a larger thickness providing for an enhanced effect. The particular means for shaping the spatial intensity profile 26 of incoming light beam 20 in embodiments 2 and 3 has not been disclosed in detail and can take many forms. For example, to produce a triangular profile 26 of the second embodiment a glass plate with a graded thickness of absorbing material in the visible light range could be employed.

Figure 4:
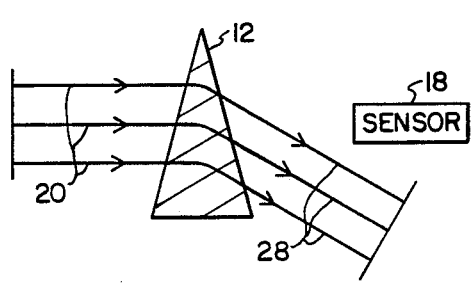
FIG. 4 is a fourth embodiment of the present invention and is a variation to the second embodiment.

FIG. 4 is a fourth embodiment of the present invention which is a variation on the second embodiment. Herein the spatial profile 26 of incoming wave front 20 is not affected independent of medium 12, but instead medium 12 is shaped to provide the desired degree of refraction. A wedge shape is a convenient shape for providing a triangular asymmetric spatial profile 26.

Figure 5:
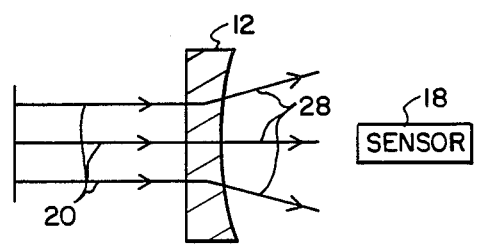
FIG. 5 is a fifth embodiment of the present invention and a variation of the third embodiment.

Similarly FIG. 5 shows a fifth embodiment of the present invention wherein medium 12 is shaped as a lens having an arcuate surface 30 which is disposed in concave relation to sensor 18. Wave front 20 is again not affected prior to striking medium 12.

Of course the particular geometries of medium 12 for the fourth and fifth embodiment are given merely by way of example. Those skilled in the art will recognize that numerous geometries may be employed to provide for sufficient refraction or defocusing of wave front 20 to accomplish the purpose of reducing the amount of light reaching sensor 18 to a desired level. Multiple medium 12 elements could even be employed. Medium 12 could also be provided as a coating on a transparent substrate of various configurations.

The present invention is particularly useful in laser hardening applications because of the ultra fast switching time that nonlinear medium such as medium 12 possess. For example in the first embodiment, dispersive bistable device 10 will readily provide subpicosecond response time to an incident laser pulse 20. Also the present invention provides a large dynamic range which affords protection against not only the most common or expected wavelengths but unusual wavelengths too. The passive laser countermeasures afforded by the present invention offer distinct advantages over narrow band rejection filters, semiconductor to metal transition materials and electro-optical shutters which lack either the large dynamic range or ultra fast switching time of the present invention.

What is claimed is:

1. A device for reducing the amount of incoming light, irradiating an object, comprising:
   a solid nonlinear optical medium having an index of refraction n which is a function of the intensity of light irradiating said medium, said medium being positioned so that said incoming light will irradiate said medium before said incoming light can irradiate said object;
   means for spatially shaping the intensity profile of said incoming light so that a corresponding spatial profile of said refractive index is provided within said medium; and wherein said medium is further positioned so that at least a protion of said incoming light will be sufficiently refracted by said medium, without the application of an external electric field to said medium, so that said portion of said incoming light does not irradiate said object.

2. The device of claim 1 wherein:

said medium includes first and second oppositely disposed, optically flat surfaces positioned in parallel relationship, and said means for spatially shaping the intensity profile of said incoming light is adapted to provide a triangular intensity profile.

3. The device of claim 1 wherein:

said medium includes first and second oppositely disposed, optically flat surfaces positioned in parallel relationship, and said means for spatially shaping the intensity profile of said incoming light is adapted to provide a Gaussian intensity profile.

4. A method of protecting a target device which performs a function, from damage by a laser of a given maximum power, comprising:

providing a solid nonlinear optical medium;

positioning said medium in the expected path of said laser so that said laser will strike said medium before said laser reaches said target device;

configuring said medium, without application of an external electric field to said medium, so that said laser will be refracted as it passes through said medium;

further positioning said target so that any energy from said laser that reaches said target will not be sufficient to impair the operation of said target device; and shaping the intensity profile of said laser prior to said laser irradiating said medium.

* * * * *